April 26, 1960     J. G. KENANN ET AL     2,934,090
THREE-WAY MAGNETIC VALVE
Filed Nov. 25, 1955
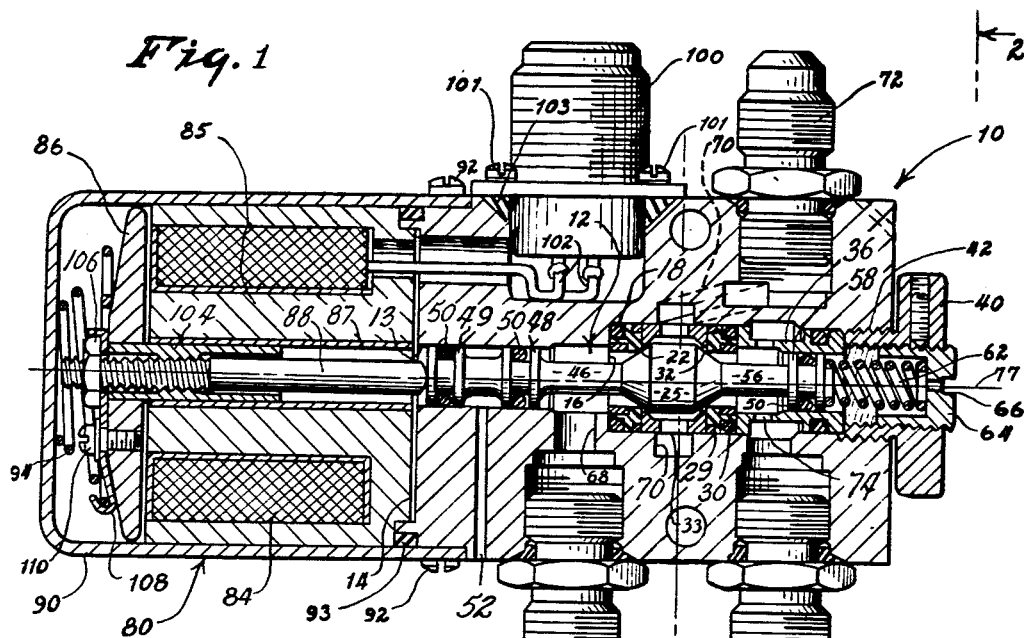
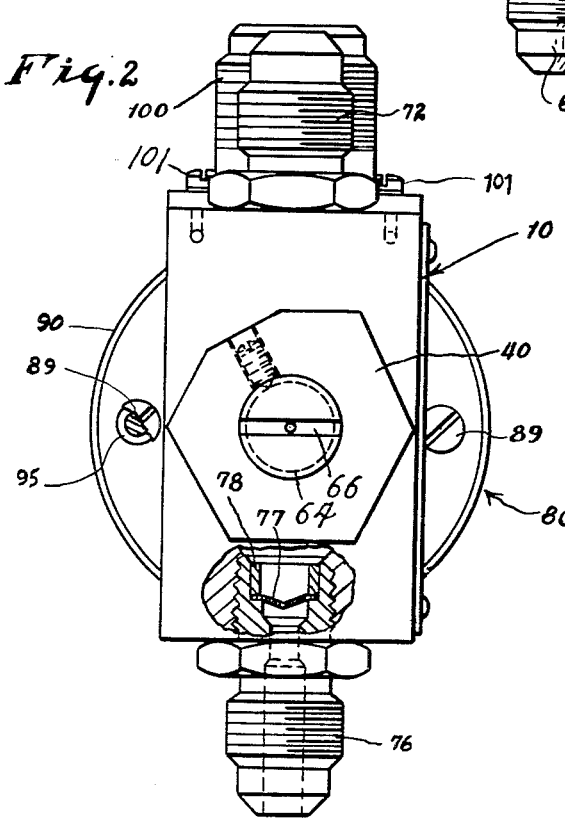
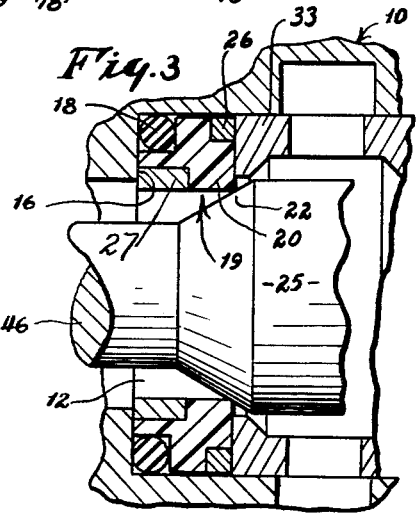
INVENTOR.
John G. Kenann
BY Joseph DeSaranto Jr.
Emery, Varney,
Whittemore & Dix
ATTORNEYS United States Patent Office 2,934,090
Patented Apr. 26, 1960

2,934,090

THREE-WAY MAGNETIC VALVE

John G. Kenann, Millburn, and Joseph Detaranto, Jr., Parsippany, N.J., assignors to Marotta Valve Corporation, Boonton, N.J., a corporation of New Jersey Application November 25, 1955, Serial No. 548,969

4 Claims. (Cl. 137—625.5)

This invention relates to improvements in valves, and more especially to three-way magnetically operated valves. The invention is especially concerned with valves for use with high pressure fluids.

It is an object of the invention to provide an improved three-way valve. One feature of the invention relates to a construction whereby different ports of the valve can be used for the inlet, and the valve can be connected so as to operate as either a normally open, a normally closed, or a shuttle valve. It is a feature of the construction that the valve operates equally well regardless of which of the ports is used for the inlet, and regardless of whether it is used for a normally open, a normally closed, or a shuttle valve application. The construction of the invention includes a two-way counterbalancing of the valve elements in order to obtain such flexibility of operation.

Another object of the invention is to provide an improved valve that seals with less force. In the preferred construction a high spring rate is used to urge the valve element toward closed position in one direction so that when the magnetic actuator is deenergized, the valve element "snaps back"; and the resulting impact is what makes possible the sealing with less force.

Another feature of the invention relates to the construction of the valve seat. A composite construction or assembly has a plastic seating surface in contact with the valve element, and has metal reinforcing in position to prevent fatigue cracks from cyclic operation with the valve element wedging into the seat and to prevent distortion by components of the force exerted by the sealing means.

Another object of the invention is to provide an improved magnetically-operated valve. The magnetic actuator is located at one end of the valve housing and one feature relates to a construction for sealing the actuator housing from the atmosphere, humidity, salt, fungus, and other environmental conditions, and for protecting the actuator from high pressure fluid which may escape past a packing, or counterbalancing piston, from the valve chamber.

Other objects, features and advantages of the invention will appear or be pointed out as the description proceeds.

In the drawing, forming a part hereof, in which like reference characters indicate corresponding parts in all the views:

Figure 1 is a sectional view taken through the longitudinal axis of a three-way valve assembly embodying this invention;

Figure 2 is an end view of the valve assembly shown in Figure 1; and

Figure 3 is an enlarged sectional view of one of the seat assemblies.

The valve assembly shown in Figure 1 includes a housing 10 in which there is a valve chamber 12. This valve chamber is a part of an opening or bore which extends all the way through the housing 10 from a rearward face 14 of the housing.

The bore 13 is cylindrical in cross section, but has different inside diameters along different portions of its length. At one region lengthwise of the bore 13 there is a shoulder 16 with an O-ring 18 and a seat assembly 19 held against the shoulder 16.

The assembly 19 includes a seat element 20 (Fig. 3) which is preferably of plastic and the inside forward portion of this seat element 20 is shaped to provide a seat 22 for a valve element 25. In the construction illustreated the inside forward corner of the opening through the seat element is rounded to provide the valve seat 22, but wider, tapered seats may be provided, the seat 22 being merely representative of valve seats against which the valve element 25 may be held to stop flow of fluid through the opening in the seat element 20.

The seat assembly 19 shown in Figure 3 has two reinforcing rings. These include an outside ring 26, preferably made of metal, such as aluminum, at the same end of the assembly as the seat 22. This reinforcing ring 26 prevents fatigue cracks which might otherwise occur from the cyclic operation with the tapered face of the valve element 25 wedging into the seat. An inside reinforcing ring 27 is located at the same end of the assembly as the O-ring 18. This reinforcing ring 27, which is also preferably of metal, such as aluminum, prevents distortion of the plastic by the O-ring, or any other inward radial components of pressure resulting from the sealing of the seat assembly against leakage of fluid between the outside of the seat assembly and the inside face of the housing.

A similar valve seat assembly 29 (Figure 1) with an O-ring 30 is located on the other side of the valve element 25 in position to provide a seat 32 for another face of the valve element 25.

The seat assemblies 19 and 29 are held in space relation to one another by a cage 33; and this cage is long enough to space the seats 22 and 32 further apart than are the portions of the valve element which contact with the seats. Thus the valve element 25 is spaced from one or both of the seats 22 and 32 at all times.

A retaining sleeve 36 presses the seat assembly 29 against the cage 33 and holds the cage 33 against the seat assembly 19, and the seat assembly 19 against the shoulder 16. The retaining sleeve 36 is in turn clamped in position by a threaded end fitting 40, which screws into threads 42 provided in the forward end of the bore 13.

The valve element 25 has a rearwardly extending stem or extension 46. One end of this extension is of enlarged diameter to provide two pistons 48 and 49. Each of these pistons is packed, and in the construction illustrated the packing is an O-ring 50.

The space between the packing rings 50 of the pistons 48 and 49 communicates with a vent passage 52 opening through a wall of the housing 10 for the escape of any high pressure fluid if any high pressure fluid should leak past the packing of the first piston 48. The spacing between the pistons 48 and 49 is somewhat greater than the maximum travel of the valve element 25, and the pistons 48 and 49 are so located with respect to the vent passage 52 that neither of these pistons 48 and 49 ever crosses or blocks the vent passage 52.

At the forward end of the valve element 25 there is a stem or extension 56 having its forward end of enlarged diameter to provide a counter-balancing piston 58 which is packed, the packing preferably comprising an O-ring 50.

A spring 62 bears against the head of the piston 58 and urges the valve element 25 into contact with the valve seat 22. The spring 62 is preferably helical, and it is compressed between the piston 58 and an adjusting screw 64 having a rearward recess into which the spring 62 extends. This adjusting screw 64 threads into the fitting 40 and has a slot 66 for receiving a tool for turning the screw 64. By advancing or retracting the screw 64, the pressure of the spring 62 can be adjusted to change the force required to move the valve element 25 away from the seat 22 and into contact with the seat 32, and to change the force with which the spring 62 moves the valve element 25 back against the seat 22 when the force compressing the spring is released.

The spring 62 is preferably made with a high spring rate so that it moves the valve element 25 quickly when the compressing force of the actuator is removed, and so that the valve element moves against the seat 22 with impact. The valve element 25 is moved against the seat 32 also with impact as will be explained herein in connection with the operation of the magnetic actuator.

There are a number of passages opening through the wall of the housing and communicating with the valve chamber 12. The first of these passages, indicated by the reference character 68, communicates with the valve chamber at a location ahead of the piston 48 and rearward of the valve seat 22. The passage 68 has its outer end portion of enlarged diameter and threaded to receive a fitting 69.

A second passage 70 terminates in an annular recess around the outside of the cage 33 and communicates with the valve chamber 12; between the seats 22 and 32, through angularly spaced openings in the cage. This passage 70 extends through the housing 10 and has an outer portion of increased diameter into which a screened fitting 72 is threaded.

A third passage 74 communicates with the valve chamber 12 at a location forward of the valve seat 32 but rearward of the piston 58. This passage 74 has an enlarged outer portion into which threads a fitting 76.

The fittings 69, 72 and 76 are special fittings, each with a screen 77 clamped against a shoulder in the fitting by a bushing 78 secured in the fitting. These screens are to prevent particles from getting into the housing and possibly damaging a valve seat.

The pistons 48 and 49 slide in the bore 13 which serves as bearing means for supporting the valve element 25 from its rearward end. The piston 58 slides in the retaining sleeve 36 which serves as bearing means for supporting the valve element 25 from its forward end. The pistons 48 and 58 are preferably of sufficient diameter to provide counter-balancing pressure for the valve element 25.

Beyond the rearward face 14 of the housing 10, there is a magnetic actuator 80 for operating the valve element. This actuator 80 has a winding 84, a core 85, an armature 86, a sleeve 87 and a plunger 88. The plunger 88 contacts with the rearward face of the piston 49. When the valve element 25 is in contact with the valve seat 22, the armature 86 is spaced from the face of the core 85 by a distance slightly greater than the travel of the valve element.

When the actuator is energized, therefore, the armature 86 is attracted to the core and displaces the plunger 88 and valve element 25 toward the front of the valve assembly far enough to bring the valve element into contact with the valve seat 32. This operation of the valve element 25 by the actuator compresses the spring 62 and stores the energy in the spring for returning the valve element 25 to its original position when the actuator is de-energized.

As the gap between the armature 86 and the windings 84 shortens, the pull on the armature increases rapidly and at a rate which more than compensates the increasing compression force of the spring 62. This increasing force brings the valve element against the seat 32 with impact. The length of the operating parts is preferably selected to bring the valve element 25 against the seat 32 before the armature 86 reaches the core 85 and to cause the armature 86 to come into contact with the core when the seat material of the seat assembly 29 has compressed to the desired extent under the closing force.

The actuator is carried at the rearward end of the housing 10 by the core screws 89 (Fig. 2) and there is a housing or shell 90 enclosing the actuator. This shell 90 is connected to the housing 10 by screws 92 (Fig. 1) or any other suitable fastening means, and is sealed by an O-ring 93 between the shell and the valve housing that supports it so as to prevent dust or any other foreign matter from getting inside this shell 90. The core screws are also sealed with O-rings 95 to prevent any foreign matter from getting inside the solenoid.

There is a spring 94 compressed between the armature 86 and the end face of the shell 90. This spring 94 exerts a pressure against the force of the spring 62 but the pressure of the spring 94 is light, compared to the pressure of the spring 62, and the purpose of the spring 94 is merely to prevent vibration of the parts when the valve element is used with equipment which produces vibration.

A receptacle 100 is connected to the housing 10 by screws 101 for receiving a plug of a power line. This receptacle 100 is connected with the actuator windings 84 by conductors 102 for supplying power to energize the actuator. The receptacle is sealed by O-ring 103 to prevent any foreign matter from getting inside the actuator.

The valve assembly of this invention is intended for use with fluids at high pressure, and the provision of the vent passage 52 protects the actuator from fluid which may leak past the packing 50 of the piston 48. Without this vent passage 52 and piston 49, escape of high pressure fluid past the piston 48 would blow the actuator off the housing 10 and this would constitute both a mechanical and an electrical hazard. The vent passage 52, therefore, is an expedient which makes the improved magnetic valve of this invention safe for use with fluids at very high pressure. The piston 49 with its packing ring 50 serves also to prevent any foreign matter from getting inside the actuator.

The position of the valve element 25 when the armature 86 is drawn up against the face of the core 85 can be adjusted by changing the position of the armature 86 longitudinally along the plunger 88.

The connection of the armature 86 to the plunger 88 is shown clearly in Fig. 1. The rearward end of the plunger 88 is threaded and there is a non-magnetic sleeve 104 rigidly connected to the armature 86 and provided with threads along part of the threaded length of the plunger 88. The armature 86 can be adjusted lengthwise along the plunger 88, therefore, by merely screwing the sleeve 104 along the threads of the plunger.

In order to prevent the sleeve 104 from turning on the plunger 88, after the desired adjustment has been made, a lock nut 106 is threaded on the plunger 88 adjacent to the rearward end of the armature 86. A clip 108 has an opening through which the plunger 88 extends and the lock nut 106 clamps this clip 108 firmly against the rearward end of the armature 86. A portion of the clip 108 is connected to the armature 86 by a screw 110 extending through an arcuate slot in the clip. Tightening of the screw 110 clamps the clip 108 against the armature 86 and this prevents the clip from turning with respect to the armature 86. The other side of the clip 108 extends up against one of the flat sides of the lock nut 106 to prevent the lock nut from rotating.

The preferred embodiment of the invention has been illustrated and described, but changes and modifications can be made without departing from the invention as defined in the claims.

What is claimed is:

1. In a valve assembly of the class wherein a housing has a chamber therein, and there is a valve element located in the chamber and having different faces on different sides thereof, two plastic seats confronting one another at longitudinally spaced locations along the valve chamber, in positions for contact with the respective faces of the valve element which operates as a poppet valve as it moves longitudinally in the chamber in opposite directions, the valve chamber having a port communicating with it between the valve seats and other ports communicating with it beyond the valve seats, the combination with said valve element of an electromagnetic motor that moves the valve element, said motor including a stem, a winding, a ferrous core magnetized by the winding, and an armature connected directly to the stem and extending across a face of the core and movable through a stroke toward and from the face of the core for attraction by the magnetized core by a force having a curve that becomes asymptotic as the armature approaches the core to move the stem and thrust the valve element toward closed position in one direction, the stem constituting a rigid motion transmitting connection to the valve element and the arrangement being such that the engagement of the valve element with the plastic seat in said one direction occurs when the armature is in position for attraction to the core along the asymptotic portion of the magnetic force curve and before the end of the stroke of the armature so as to effect a deformation of the plastic seat at the end of the armature stroke, and a high-rate spring that is compressed by movement of the valve element by the electro-magnetic motor in said one direction and that thrusts in a direction to move the valve element into its other closed position with a snap action and impact against the plastic seat produced by reaction of the spring against the force of the decaying magnetic attraction between the armature and core when the winding of the electro-magnetic motor is de-energized and the armature moves away from the face of the core, the stroke of the armature being close to the face of the core, and the electro-magnetic motor having force to increase the pull on the armature, within said stroke, at a rate which more than compensates the increasing compression force of the spring so that the motor brings the valve element against the plastic seat with impact whereby the valve element seals with less force.

2. The valve assembly described in claim 1 and in which the longitudinal axis of the motor core extends in the direction in which the valve element moves, and in which there are means for adjusting the force of the spring to change the electric current required to cause the motor to compress the spring and operate the valve and the resulting speed of movement of the valve element by the spring when the winding is deenergized.

3. The valve assembly described in claim 1 and in which the faces of the valve element are tapered, and the plastic valve seats have reinforcing rings around said seats at locations radially outward from the parts of the seats that contact with the tapered faces of the valve element.

4. The valve assembly described in claim 1 and in which there are means for adjusting the stroke to stop the movement of the armature and to control the deformation of the plastic seat by the force transmitted through the valve element from the stem.

References Cited in the file of this patent

UNITED STATES PATENTS

| 83,899 | Allison | Nov. 10, 1868 |
| 219,114 | Ross | Sept. 2, 1879 |
| 1,465,723 | West | Aug. 21, 1923 |
| 1,786,234 | Forman | Dec. 23, 1930 |
| 1,898,228 | Thompson | Feb. 21, 1933 |
| 2,083,584 | Wineman | June 15, 1937 |
| 2,288,912 | Mears | July 7, 1942 |
| 2,348,548 | Koehler | May 9, 1944 |
| 2,409,220 | Melichar et al. | Oct. 15, 1946 |
| 2,484,102 | Le Valley | Oct. 11, 1949 |
| 2,519,541 | Bryant | Aug. 22, 1950 |
| 2,524,142 | Seeloff | Oct. 3, 1950 |
| 2,708,561 | Ehlke | May 17, 1955 |
| 2,722,402 | Crookston | Nov. 1, 1955 |
| 2,780,433 | Fleming | Feb. 5, 1957 |
| 2,796,885 | Garrett et al. | June 25, 1957 |

FOREIGN PATENTS

| 1,000,207 | France | Oct. 10, 1951 |
| 498,849 | Canada | Dec. 29, 1953 |
| 551,622 | Canada | Aug. 18, 1955 |